Patented Sept. 12, 1922.

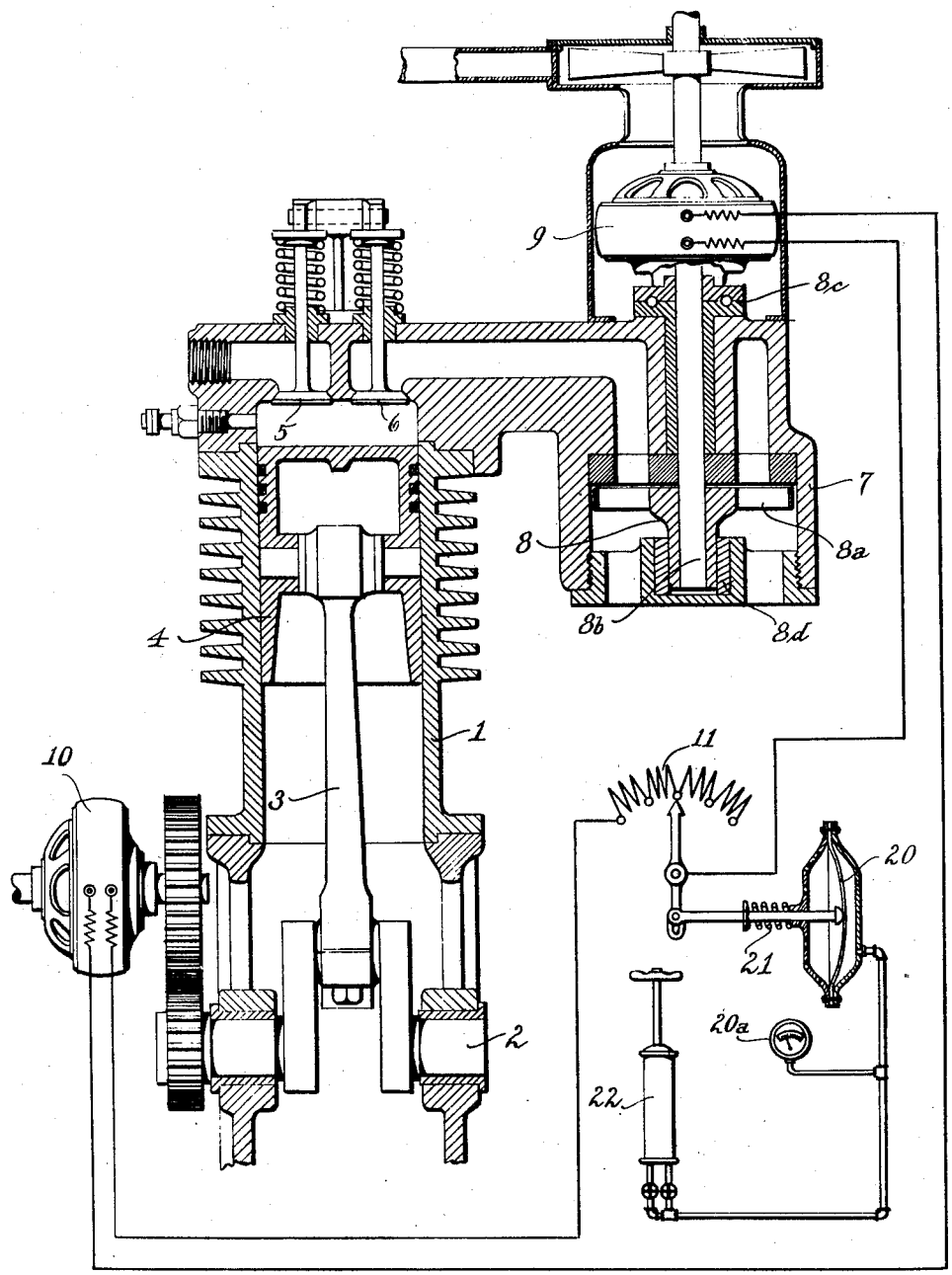

1,428,924

UNITED STATES PATENT OFFICE.

CARL C. THOMAS, OF BALTIMORE, MARYLAND.

SUPERCHARGER FOR INTERNAL-COMBUSTION ENGINES.

Application filed June 29, 1920. Serial No. 392,795.

*To all whom it may concern:*

Be it known that I, CARL C. THOMAS, a citizen of the United States of America, and a resident of the city of Baltimore, State of Maryland, have invented certain new and useful Improvements in Superchargers for Internal-Combustion Engines, of which the following is a specification.

My invention relates to superchargers for internal combustion engines, particularly aeroplane engines, and embodies control means for the supercharger including automatic control means.

In the operation of aeroplanes driven by internal combustion engines, it has been found that an engine adjusted to operate well at from sea level atmospheric pressure to one or two thousand feet elevation, does not work so well at very high elevations. To remedy this condition the so-called supercharger has been developed, the supercharger being a device of the nature of a fan, driven usually by a turbine operated by the exhaust of the engine, which fan or blower forces air under less or greater pressure into the air intake of the engine, the object being to increase the pressure at the intake so that, as atmospheric pressure falls considerably due to increased elevation, the pressure in the air intake is increased to that, or approximately that, pressure, to which the engine is adjusted for operation under normal conditions. But obviously this fan or blower should be arranged to give higher relative pressures as elevation increases; while on the other hand the power of the engine, and therefore the power of the exhaust turbine driving the supercharger, tends to decrease as the elevation of the plane increases; in other words, whereas the power of the turbine driving the supercharger should increase with increased elevation, the contrary is the case, where no special control means is provided.

The object of my invention is, therefore, to vary the power of the turbine driving the supercharger either by hand or automatically in accordance with the varying demand for power to drive the supercharger, and, more or less approximately, in inverse proportion to the varying atmospheric pressure.

I will now proceed to describe my invention with reference to the accompanying drawings, and will then point out the novel features in claims:

In said drawing, the figure there shown shows in central vertical section, and more or less diagrammatically an internal combustion engine, in connection with an exhaust turbine, to be operated by that engine, and a supercharger to be driven by that turbine, and an electric motor arranged also to drive the said supercharger, all these elements being indicated principally in central vertical section, and in the main diagrammatically only, and in connection with automatic control means indicated in part in central vertical section and in part in elevation.

In the drawings, 1 designates an engine cylinder (shown in this case as an air cooled cylinder provided with the usual radiating ribs), 2 the crank shaft, 3 the connecting rod and 4 the piston.

I have shown an engine of what is known as the four-cycle type, but in a broad sense it is immaterial whether the engine employed be of the four-cycle or of the two-cycle type. Also, I have shown one cylinder only whereas aeroplane engines commonly comprise a number of cylinders; but the principles herein described with reference to the regulation of pressure of the gases driving the turbine, are obviously applicable to any engine, independent of the number of cylinders thereof, so that illustration of the invention as applied to one cylinder only is sufficiently indicative to persons skilled in the art of the application of the invention to multi-cylinder engines of any type.

The engine shown is provided with the usual admission valve 5 and exhaust valve 6.

7 designates the turbine casing, which in this instance is formed integral with, and as a projection from, the removable head of the engine cylinder.

8 designates the rotor of the turbine comprising a series of turbine blades 8ª mounted upon the vertical shaft 8ᵇ supported by a suitable step-bearing 8ᶜ, a steadying bearing 8ᵈ being provided at the lower end of the rotor.

9 designates a motor for driving the supercharger, the rotor of this motor being mounted upon the shaft 8ᵇ; 10 designates an electric generator driven from the crank shaft of the engine in any suitable way, and 11 designates a regulator for the motor, shown in this case as a simple rheostat. There are various well known means for regulating the motor driven by the generator, for example regulation of the field of the generator or of the motor, or both, which methods are in a broad sense equivalents of the particular method of regulation illustrated, and I do not limit myself therefore, to any particular method of regulation, but intend my invention to include any suitable method of regulation.

In the drawings I have shown one means for effecting automatic regulation, comprising a diaphragm 20 exposed on one side to the internal atmosphere, the other side forming one wall of a closed chamber, to which is connected a pressure gauge 20$^a$ and a pump 22, the latter of a type adapted to serve either as a compressor or as an exhauster. By means of this pump the operator can regulate the pressure behind the diaphragm in either sense, at will. There is also a spring 21 tending to force the diaphragm outward in opposition to atmospheric pressure. It may be assumed that when starting from a point at low elevation, the chamber behind the diaphragm will be more or less exhausted, the diaphragm, therefore, acting in opposition to the spring; as elevation increases and atmospheric pressure decreases, the diaphragm will eventually be forced out so operating the regulator to bring the motor 10 into action, the supercharger being driven then both by the exhaust turbine and by the motor 10. As elevation increases therefore, the operator may increase the pressure behind the diaphragm to the atmospheric pressure then obtaining and finally, if so desired, may, by means of the pump, increase the pressure behind the diaphragm to a pressure greater than the atmospheric pressure then obtaining.

Since the exhaust turbine and the motor 10, though operating in conjunction, operate independently, it is obvious that, if desired, the exhaust turbine may be omitted altogether, and the supercharger driven entirely by the electrical means shown.

I do not limit myself to a generator driven by the engine for supplying current for operating the motor, as other means for supplying current, for example, a storage battery, may obviously be used.

What I claim is:

1. The combination of a supercharger, an engine having an exhaust-driven turbine arranged to drive that supercharger, an electric motor also arranged to drive the supercharger, and means controlled by the atmospheric pressure for automatically regulating the action of the motor.

2. The combination of a supercharger, an engine having an exhaust driven turbine arranged to drive that supercharger, the rotor of the supercharger and the rotor of the turbine being mounted upon the same shaft, an electric motor for driving that supercharger having its rotor also mounted upon said shaft, whereby the supercharger may be driven by the coaction of the turbine and the motor, and means controlled by the atmospheric pressure for automatically regulating the action of the motor.

In testimony whereof I have signed this specification in the presence of the subscribing witness.

CARL C. THOMAS.

Witness:
CLARENCE B. CLEMENTS.